(12) United States Patent
Kim et al.

(10) Patent No.: US 11,768,080 B2
(45) Date of Patent: Sep. 26, 2023

(54) OPTIMAL ROUTE SEARCHING DEVICE AND OPERATION METHOD THEREOF

(71) Applicant: Samsung Electronics Co., Ltd., Suwon-si (KR)

(72) Inventors: Minsoo Kim, Suwon-si (KR); Jaeheung Park, Suwon-si (KR); Joonwoo Ahn, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 327 days.

(21) Appl. No.: 17/032,644

(22) Filed: Sep. 25, 2020

(65) Prior Publication Data

US 2021/0302180 A1 Sep. 30, 2021

(30) Foreign Application Priority Data

Mar. 30, 2020 (KR) .................. 10-2020-0038557

(51) Int. Cl.
*G01C 21/34* (2006.01)
*G06N 3/126* (2023.01)
*G01C 21/00* (2006.01)

(52) U.S. Cl.
CPC ..... *G01C 21/3453* (2013.01); *G01C 21/3446* (2013.01); *G01C 21/3867* (2020.08); *G06N 3/126* (2013.01)

(58) Field of Classification Search
CPC ............ G06N 3/126; G06N 3/04; G06N 3/08; G06Q 10/047; G01C 21/3446; G01C 21/3453; G01C 21/3461; G01C 21/3867; G01C 21/3469
See application file for complete search history.

(56) References Cited

U.S. PATENT DOCUMENTS

| 9,783,194 | B2 | 10/2017 | Seo et al. |
| 10,012,986 | B2 | 7/2018 | Kurt et al. |
| 11,144,855 | B2* | 10/2021 | Stefik ............ G06Q 10/063116 |
| 2012/0310465 | A1* | 12/2012 | Boatright .......... G01C 21/3661 |
| | | | 701/25 |

(Continued)

FOREIGN PATENT DOCUMENTS

| JP | 4985163 B2 | 7/2012 |
| JP | 2018-185633 A | 11/2018 |

(Continued)

OTHER PUBLICATIONS

"Cooperative sweeping by multiple mobile robots", Daisuke Kurabayashi, et al., Department of Precision Machinery Engineering University of Tokyo, Apr. 1996, 7 pages.

(Continued)

*Primary Examiner* — Behrang Badii
(74) *Attorney, Agent, or Firm* — Harness, Dickey & Pierce, P.L.C.

(57) ABSTRACT

An operation method of an optimal route searching device includes: acquiring topology transformed map information; extracting a plurality of candidate routes based on the topology transformed map information; calculating a travel cost for each of the plurality of candidate routes based on a cost function; and determining a candidate route corresponding to a lowest cost one of the calculated travel costs as a travelling route.

15 Claims, 8 Drawing Sheets

(56) References Cited

U.S. PATENT DOCUMENTS

| | | | | |
|---|---|---|---|---|
| 2014/0354452 | A1* | 12/2014 | Okuyama | B60R 1/00 |
| | | | | 340/932.2 |
| 2018/0060797 | A1* | 3/2018 | Stefik | G06Q 10/063116 |
| 2018/0328745 | A1* | 11/2018 | Nagy | G01C 21/3415 |
| 2018/0359905 | A1 | 12/2018 | Foster et al. | |
| 2019/0080266 | A1 | 3/2019 | Zhu et al. | |
| 2020/0133280 | A1* | 4/2020 | Seccamonte | B60W 60/0013 |
| 2020/0173790 | A1* | 6/2020 | Kelleher | G01C 21/343 |
| 2020/0209001 | A1* | 7/2020 | Demerly | G01C 21/3453 |
| 2021/0118299 | A1* | 4/2021 | Yata | G08G 1/168 |

FOREIGN PATENT DOCUMENTS

| | | | |
|---|---|---|---|
| KR | 101278760 B1 | 6/2013 | |
| KR | 101382982 B1 | 4/2014 | |
| KR | 101637842 B1 | 7/2016 | |

OTHER PUBLICATIONS

"Genetic Algorithm", Wikipedia search dated Sep. 21, 2020.

\* cited by examiner

OPTIMAL ROUTE SEARCHING DEVICE AND OPERATION METHOD THEREOF

CROSS-REFERENCE TO RELATED APPLICATION

This application claims the benefit of Korean Patent Application No. 10-2020-0038557, filed on Mar. 30, 2020, in the Korean Intellectual Property Office, the disclosure of which is incorporated herein in its entirety by reference.

BACKGROUND

The inventive concepts relate to optimal route searching devices and operation methods thereof, and more particularly, to optimal route searching devices and operation methods thereof for searching for an empty space in a parking area with a lowest cost.

An autonomous vehicle may recognize a distance to a nearby car via an image sensor and control the vehicle itself accordingly to perform safe driving. Furthermore, due to advances in technologies related to autonomous driving, the demand for an autonomous valet parking system is increasing continuously.

However, searching for a parking space by simply recognizing the front of the vehicle may lead to inefficient vehicle driving because a preferential visit to a parking area is not considered. Thus, for an automatic valet parking system, there is a need for a global route planning method for quickly finding a vacant parking space by taking a parking area into consideration.

SUMMARY

The inventive concepts provide an optimal route for finding a parking space by using a route search algorithm based on a cost function.

According to some aspects of the inventive concepts, there is provided an optimal route searching device including processing circuitry configured to receive map information; perform a topology transformation based on the received map information; and extract a plurality of candidate routes based on topology transformed map information, calculate a travel cost for each of the plurality of candidate routes based on a cost function, and determine a candidate route corresponding to a lowest cost one of the calculated travel costs as a travelling route.

According to some aspects of the inventive concepts, there is provided an operation method of an optimal route searching device, the operation method including: acquiring topology transformed map information; extracting a plurality of candidate routes based on the topology transformed map information; calculating a travel cost for each of the plurality of candidate routes based on a cost function; and determining a candidate route corresponding to a lowest cost one of the calculated travel costs as a travelling route.

According to some aspects of the inventive concepts, there is provided a host vehicle including at least one sensor; a vehicle controller; and processing circuitry configured to receive map information; perform a topology transformation based on the received map information; and extract a plurality of candidate routes based on topology transformed map information, calculate a travel cost for each of the plurality of candidate routes based on a cost function, and determine a candidate route corresponding to a lowest cost one of the calculated travel costs as a travelling route.

BRIEF DESCRIPTION OF THE DRAWINGS

Embodiments of the inventive concept will be more clearly understood from the following detailed description taken in conjunction with the accompanying drawings in which.

DETAILED DESCRIPTION OF EXAMPLE EMBODIMENTS

Hereinafter, example embodiments of the inventive concepts will be described in detail with reference to the accompanying drawings. Prior to the detailed description thereof, the terms herein are defined as follows.

Figure 1:
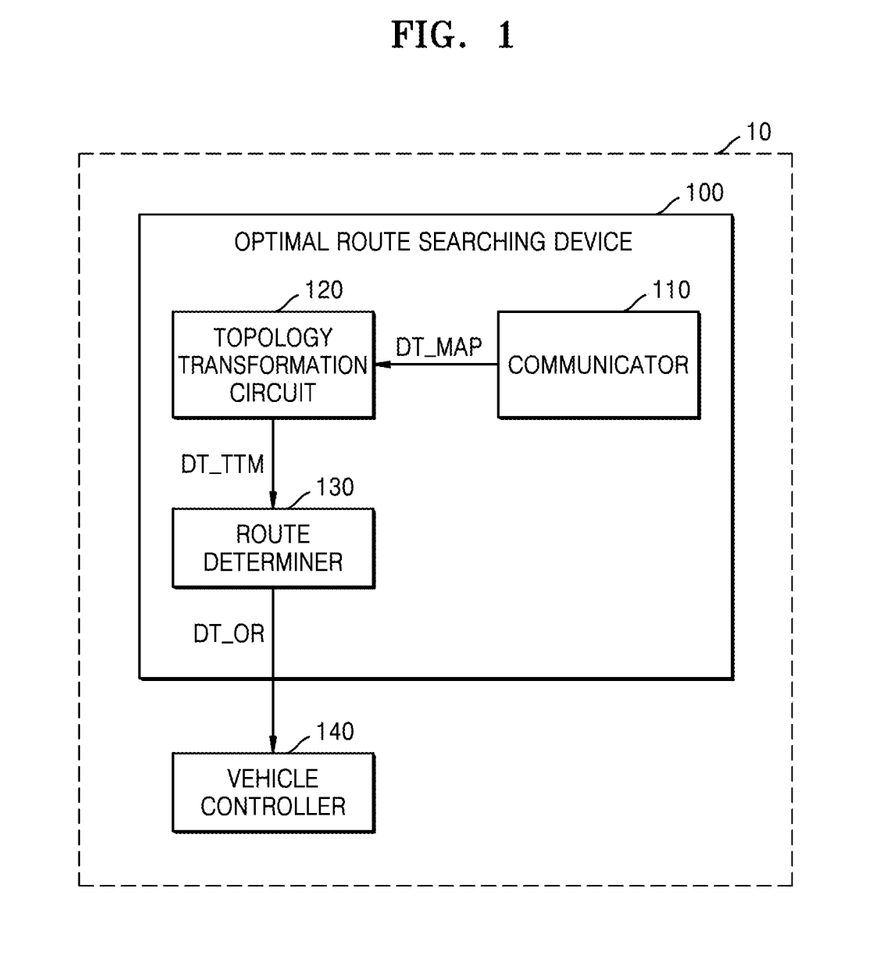
FIG. 1 is a block diagram of an autonomous valet parking (AVP) system according to some example embodiments of the inventive concepts.

FIG. 1 is a block diagram of an autonomous valet parking (AVP) system according to some example embodiments of the inventive concepts.

Referring to FIG. 1, an AVP system 10 may include an optimal route searching device 100 and a vehicle controller 140.

The AVP system 10 may refer to a system for autonomously parking a vehicle by searching for an empty space in a parking area after a vehicle arrives at a destination and drops off its passenger at the destination. The optimal route searching device 100 may find (e.g., generate) a route for efficiently searching for an empty space in a parking area where a vehicle is currently located and provide the found route to the vehicle.

In some example embodiments, the optimal route searching device 100 may include a communicator 110, a topology transformation circuit 120, and a route determiner 130.

The searching device 100 (and/or other components, for example, communicator 110, topology transformation circuit 120 and router determiner 130, etc.) may include processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include a non-transitory computer readable storage device, for example a solid state drive (SSD), storing a program of instructions, and a processor configured to execute the program of instructions to implement the functionality and/or methods performed by some or all of the searching device 100.

The communicator 110 may receive map information DT_MAP from an external device located outside the optimal route searching device 100. The external device may include a kiosk situated in a parking area, a beacon that periodically transmits a signal, or a satellite device, although example embodiments are not limited thereto. For convenience of description, it is assumed hereinafter that the map information DT_MAP is received from a satellite device. The communicator 110 may receive the map information DT_MAP from the satellite device and transmit the map information DT_MAP to the topology transformation circuit 120.

The topology transformation circuit 120 may receive the map information DT_MAP from the communicator 110 and perform a topology transformation thereon. The topology transformation may refer to a process of extracting and visualizing specific information from the map information DT_MAP. For example, when the map information DT_MAP undergoes topology transformation, pieces of information such as an actual parking space in the entire parking area, a road for moving between parking spaces, a node where a plurality of roads intersect, etc. may be represented as visual information such as edges and nodes. The topology transformation circuit 120 may perform a topology transformation on the map information DT_MAP to generate topology transformed map information DT_TTM. The topology transformed map information DT_TTM may then be transmitted to the route determiner 130 and used to estimate a route for searching for a parking space at a lowest cost, the lowest cost being described further below.

In some example embodiments, the topology transformation circuit 120 may include an intellectual property (IP) for a neural network. The transformation circuit 120 may be a processor optimized for simultaneous matrix operations. The transformation circuit 120 may perform a plurality of operations in real-time, perform self-learning based on accumulated data, and derive topology transformed map information. Examples of a neural network may include, but are not limited to, various types of neural network models including convolution neural networks (CNNs) such as GoogLeNet, AlexNet, visual geometry group (VGG) network, etc., regions with CNNs (R-CNNs), region proposal networks (RPNs), stacking-based deep neural networks (S-DNNs), recurrent neural networks (RNNs), stacking-based DNNs (S-DNNs), state-space dynamic neural networks (S-SDNNs), deconvolution networks (DNs), deep belief networks (DBNs), restricted Boltzmann machines (RBMs), fully convolutional networks (FCNs), etc. Alternatively or additionally, such machine learning systems may include other forms of machine learning models, such as, for example, linear and/or logistic regression, statistical clustering, Bayesian classification, decision trees, dimensionality reduction such as principal component analysis, and expert systems; and/or combinations thereof, including ensembles such as random forests. Such machine learning models may also be used to provide for example, at least one of various services and/or applications, e.g., an image classify service, an advanced driver assistance system (ADAS) service, or the like, and may be performed, executed, implemented, processed, or the like by some or all of any of the systems and/or devices described herein By identifying a parked vehicle or an area marked with white paint on a road based on the map information DT_MAP, the IP for the neural network may separate and identify a region where an actual parking space is located in the entire parking area, a road for entering a parking space, a road corresponding to the parking space, etc. In other words, the neural network may be trained to separate and identify a region where an actual parking space is located in the entire parking area, a road for entering a parking space, a road corresponding to the parking space, etc.

The route determiner 130 may generate optimal route information DT_OR based on the topology transformed map information DT_TTM received from the topology transformation circuit 120. For example, the route determiner 130 may estimate a route for searching for a parking space with a minimum cost by combining a cost function with a route search algorithm. The route determiner 130 may acquire optimal route information DT_OR and transmit the optimal route information DT_OR to the vehicle controller 140 capable of controlling a host vehicle (not shown).

The vehicle controller 140 may control the host vehicle based on the optimal route information DT_OR. For example, the vehicle controller 140 may control forward motion, reverse motion, steering, acceleration, or deceleration of the host vehicle such that the host vehicle may sequentially move along routes included in the optimal route information DT_OR.

Figure 2:
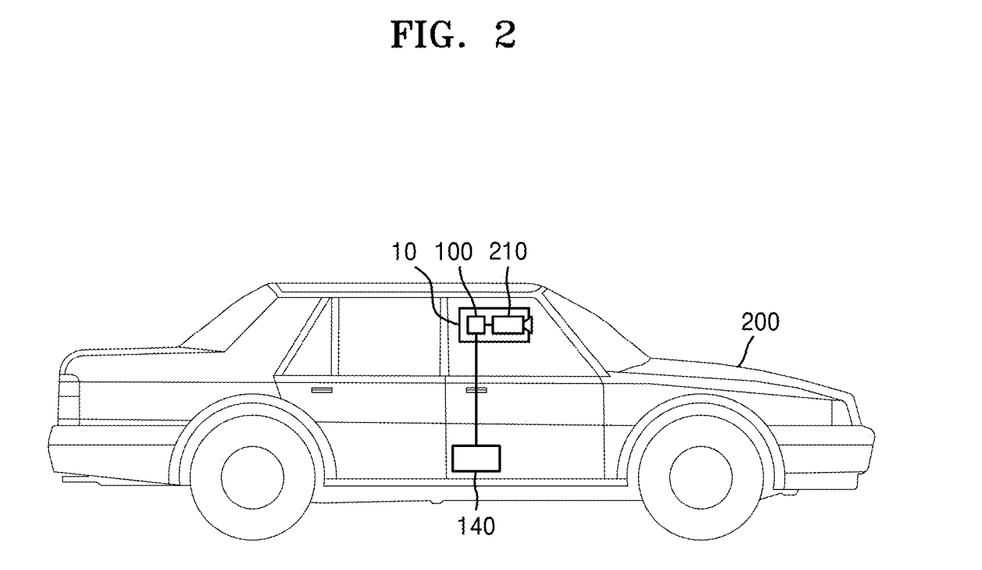
FIG. 2 is a side view of a host vehicle according to some example embodiments of the inventive concepts.

FIG. 2 is a side view of a host vehicle according to some example embodiments of the inventive concepts. For convenience, descriptions already provided with respect to FIG. 1 will be omitted here.

Referring to FIG. 2, a host vehicle 200 may include an AVP system 10, a vehicle controller 140, and at least one sensor 210.

The host vehicle 200 may refer to a vehicle that performs autonomous parking based on the AVP system 10. The optimal route searching device 100 of the AVP system 10 may be electrically or physically connected to the host vehicle 200. An optimal route searching device 100 of the AVP system 10 may be embedded in the host vehicle 200 or may be attached to the outside of the host vehicle 200. According to some example embodiments, the host vehicle 200 may be referred to by various terms including an ego-vehicle, a self-vehicle, an autonomous driving vehicle, etc.

In some example embodiments, the host vehicle 200 may travel along a route for searching for a parking space at the lowest cost. For example, referring to FIGS. 1 and 2 together, the vehicle controller 140 may automatically drive, or control, the host vehicle 200 based on the optimal route information DT_OR generated by the route determiner 130 of the AVP system 10. Accordingly, the driving of host vehicle 200 may be enabled and/or may be improved (e.g., the vehicle may drive along a particular trajectory through the surrounding environment according to the optimal route information DT_OR) based on determining a low cost route based on implementing some or all of any functions of any portions of any electronic devices according to some example embodiments of the inventive concepts.

The at least one sensor 210, which may be at least one camera 210 in some example embodiments, may acquire peripheral image information regarding a periphery of the host vehicle 200 during driving according to the optimal route information DT_OR. The host vehicle 200 may identify, based on peripheral image information acquired by the at least one sensor 210, an empty parking space while driving through a parking area and then complete parking. The at least one sensor 210 may include, for example, at least one of various kinds of sensing devices, such as a full-spectrum camera, an IR camera, a LIght Detection And Ranging (LIDAR) sensor, a RAdio Detection And Ranging (RADAR) sensor, a Time of Flight (ToF) sensor, an ultrasonic sensor, and an infrared sensor. Moreover, the LIDAR sensor and the RADAR sensor may be classified according to an effective measuring distance. For example, LIDAR sensors may be classified into a long LIDAR sensor and a short LIDAR sensor, and RADAR sensors may be classified into a long RADAR sensor and a short RADAR sensor. However, the at least one sensor 210 according to the inventive concepts are not limited thereto, and the at least one sensor 210 may include at least one of a magnetic sensor, a position sensor (e.g. a global positioning system (GPS)), an acceleration sensor, a pressure sensor, a temperature/humidity sensor, a proximity sensor, and a gyroscope sensor. Functions of the respective sensors may be intuitively inferred from names thereof by one skilled in the art, and thus, a detailed description thereof will be omitted.

Figure 3:
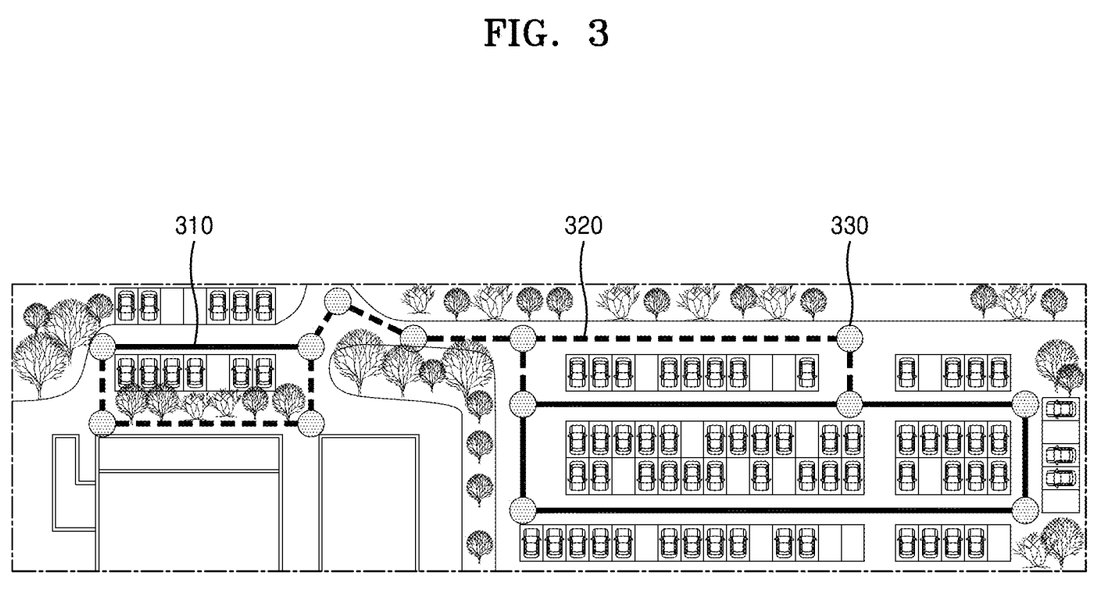
FIG. 3 illustrates an example of a topology transformed map according to some example embodiments of the inventive concepts.

FIG. 3 illustrates an example of a topology transformed map according to some example embodiments of the inventive concepts.

Referring to FIG. 3, topology transformed map information DT_TTM may include pieces of information about essential edges 310, optional edges 320, and nodes 330.

According to some example embodiments, the essential edges 310 may refer to roads corresponding to actual parking spaces in the entire parking area. Each required edge 310 may refer to a space for a minimal manipulation required to park the host vehicle (200 of FIG. 2) in a parking space. In other words, the essential edges 310 may correspond to roads that the host vehicle 200 must visit for parking.

According to some example embodiments, the optional edges 320 may include the remaining edges other than the essential edges 310 in the entire parking area. For example, each of the optional edges 320 may correspond to a road connecting the essential edges 310 with each other from among roads constituting the entire parking area. In other words, the optional edges 320 may correspond to roads that the host vehicle 200 may optionally visit without needing to visit for parking.

According to some example embodiments, each of the nodes 330 may correspond to a cross point between edges. The nodes 330 may include a point where the essential edges 310 intersect with each other, a point where the optional edges 320 intersect with each other, and a point that the required and optional edges 310 and 320 intersect with each other.

Figure 4A:
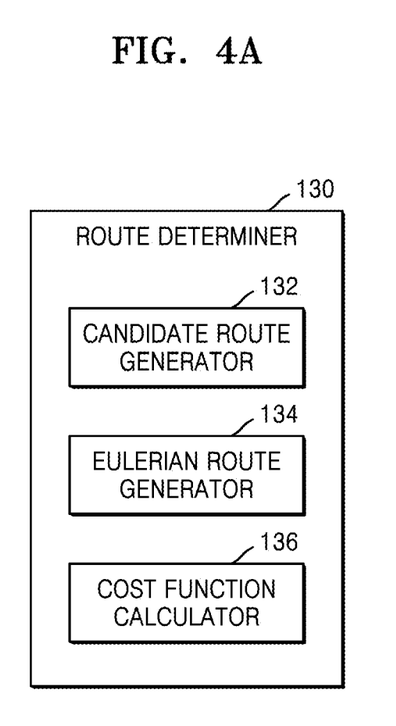
FIG. 4A illustrates a detailed configuration of a route determiner according to some example embodiments of the inventive concepts.

FIG. 4A illustrates a detailed configuration of a route determiner according to some example embodiments of the inventive concepts.

Referring to FIG. 4A, the route determiner 130 of FIG. 1 may include a candidate route generator 132, an Eulerian route generator 134, and a cost function calculator 136.

A route selection problem encountered in the route determiner 130 may correspond to a rural postman problem (RPP). When edges that must be visited at least once ("essential edges") and edges that may be optionally visited ("optional edges") coexist, the RPP may be defined as a problem of finding a route for visiting all essential edges while visiting optional edges at a minimum cost.

The candidate route generator 132 may generate a plurality of routes that are to be selected by the host vehicle (200 of FIG. 2). The candidate route generator 132 may generate a plurality of candidate routes by using the essential edges (310 of FIG. 3) and the optional edges (320 of FIG. 3) in the topology transformed map information DT_TTM. For example, each candidate route may include all the essential edges 310 in the topology transformed map information DT_TTM but selectively include at least some of the optional edges 320. In other words, each of the candidate routes may refer to each of various routes that must visit the essential edges 310 corresponding to spaces for parking the host vehicle 200 but may selectively visit the optional edges 320 other than the essential edges 310.

Figure 4B:
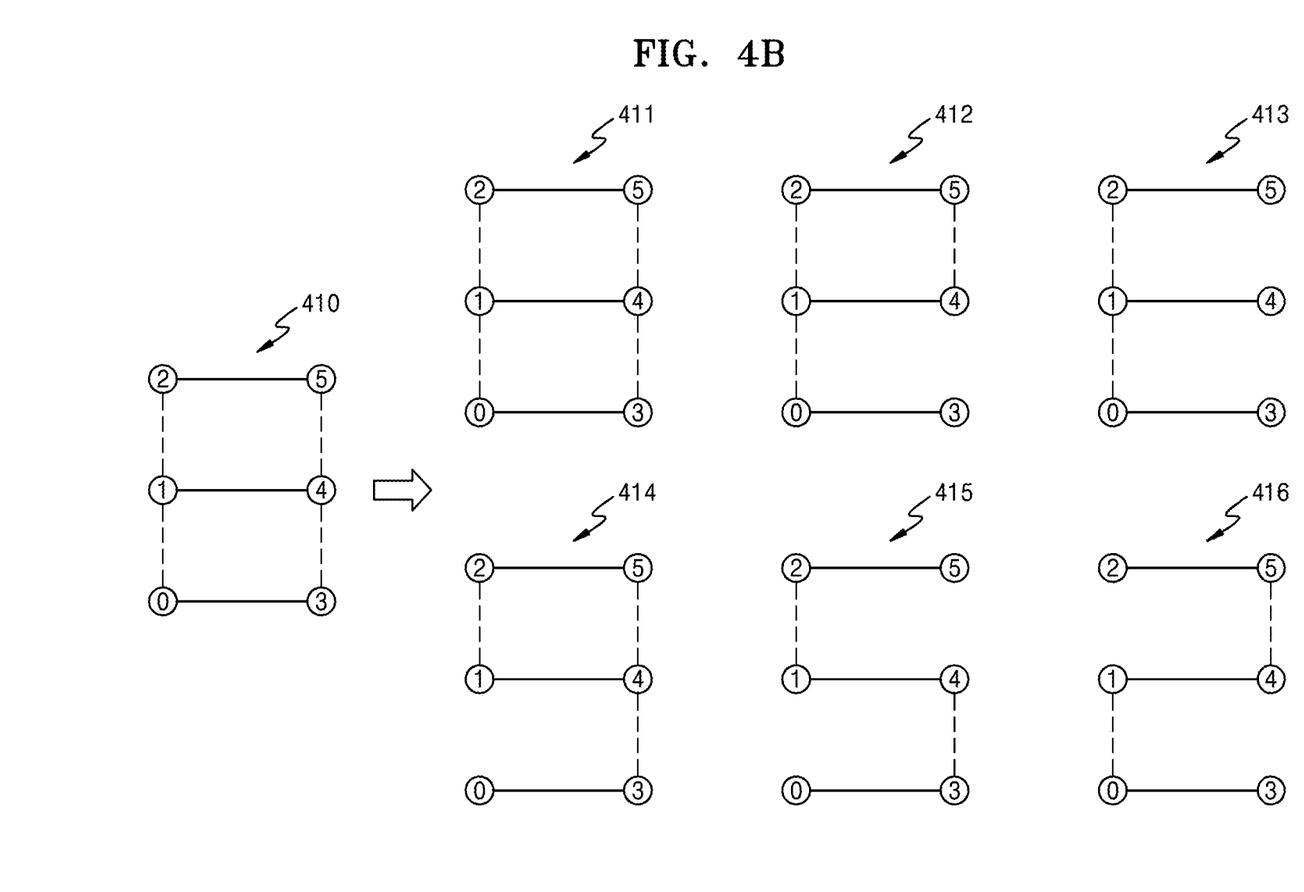
FIG. 4B illustrates an example of extracting candidate routes according to some example embodiments of the inventive concepts.

FIG. 4B illustrates a plurality of candidate routes. The entire route 410 may correspond to topology transformed map information DT_TTM. In other words, as seen in the entire route 410, a parking area includes six (6) cross points that are nodes 0 through 5 and corresponds to three (3) roads (a road between nodes 0 and 3, a road between nodes 1 and 4, and a road between nodes 2 and 5). The roads may be essential edges, and the paths between nodes 2, 1, and 0 and 5, 4, and 3 may be optional edges.

According to some example embodiments, the candidate route generator 132 may generate a plurality of candidate routes, i.e., first through sixth candidate routes 411 through 416, based on the entire route 410. For example, the first candidate route 411 may be identical to the entire route 410. This is because an arbitrary candidate route may include not only all essential edges but also all optional edges.

According to some example embodiments, each of the second and fourth candidate routes 412 and 414 may include all edges except for one optional edge. The second candidate route 412 may include all the remaining edges other than optional edge connecting nodes 3 and 4, and the fourth candidate route 414 may include all the remaining edges other than optional edge connecting nodes 0 and 1.

According to some example embodiments, each of the third candidate route 413, the fifth candidate route 415, and the sixth candidate route 416 may include all edges except for two optional edges. The third candidate route 413 may include all the remaining edges other than the optional edge connecting nodes 3 and 4 and optional edge connecting nodes 4 and 5. The fifth candidate route 415 may include all the remaining edges other than the optional edge connecting nodes 0 and 1 and the optional edge connecting nodes 4 and 5. The sixth candidate route 416 may include all the remaining edges other than the optional edge connecting nodes 3 and 4 and an optional edge connecting nodes 1 and 2.

According to some example embodiments, the Eulerian route generator 134 may add at least one virtual edge to each of the first through sixth candidate routes 411 through 416 such that each candidate route satisfies a condition for an Eulerian route. The Eulerian route may refer to a route for visiting all edges in a graph once. The problem of finding a route in the Eulerian route may correspond to a problem of finding a route for passing through all edges in the graph at least once without distinguishing between required and optional edges in a given Eulerian route.

Figure 4C:
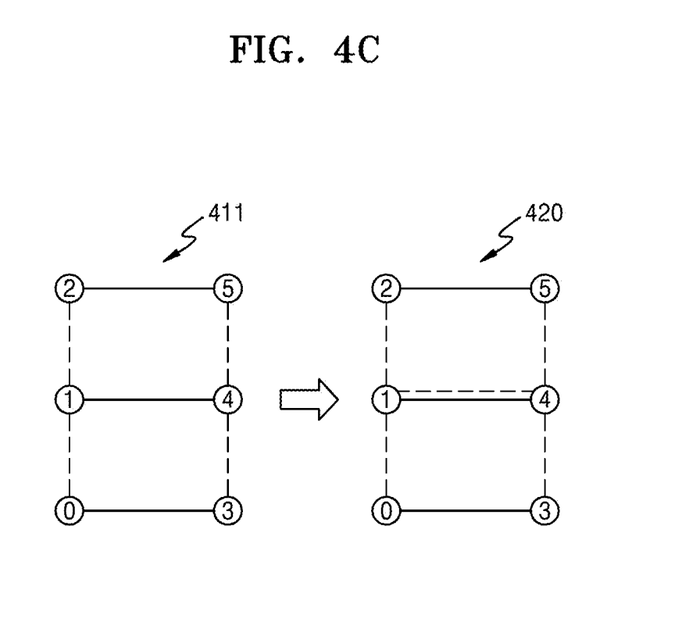
FIG. 4C illustrates an example of generating an Eulerian route according to some example embodiments of the inventive concepts.

FIG. 4C illustrates the entire route 411 and an Eulerian route 420. The Eulerian route generator 134 may count the number of edges connected to each of the nodes 0 through 5 of the entire route 411. Referring to the entire route 411, the Eulerian route generator 134 may identify that an even number of edges are connected to each of nodes 0, 2, 3, and 5, and an odd number of edges are connected to nodes 1 and 4.

The Eulerian route generator 134 may add a virtual optional edge between the nodes 1 and 4 to convert the entire route 411 into the Eulerian route 420. In the Eulerian route, the degrees of all nodes (the number of edges connected to each node) must be even. The Eulerian route generator 134 may add a virtual optional edge based on a minimum weighted matching algorithm. The minimum weight matching algorithm may refer to an algorithm for minimizing the number of virtual optional edges to be newly added while setting a length of a virtual optional edge to be newly added as small as possible. Referring to FIG. 4C, because nodes 1 and 4 each have a degree of 3, the Eulerian route generator 134 may add a virtual optional edge between nodes 1 and 4.

According to some example embodiments, the cost function calculator 136 may compute a travel cost for each of a plurality of candidate routes. The cost function may be defined according to the following Equation (1).

$$\text{Cost} = \Sigma_{i=0}^{N} \gamma_i p_i \|E_i\| + w_{gear} c_i \quad (1)$$

where i is the order of visiting edges, N is the total number of edges that a found route visits, and $\gamma_i$ is a weight assigned according to the order of visiting i and is calculated as N−i/N. By reflecting the weight $\gamma_i$, an edge that is preferentially visited by the host vehicle 200 may have a weight $\gamma_i$ approaching 1. $p_i$ denotes whether an edge corresponds to a road available for parking, and has a value of −1 when the edge is a required edge and a value of +1 when the edge is an optional edge. When an edge visited by the host vehicle 200 is a required edge, $p_i$ has a negative value, and accordingly, a parking cost value may be reduced. When the edge visited by the host vehicle 200 is an optional edge, $p_i$ has a positive value, and accordingly, a parking cost value may be increased. $\|E_i\|$ denotes a length of an edge. In this case, $E_i$ is an i-th visited edge in a route. $c_i$ represents whether a vehicle switches from forward to reverse or vice versa.

According to some example embodiments, when the i-th visited edge $E_i$ is the same as an i−1-th visited edge $E_{i-1}$ in the route, this means that the route successively traverses the same edge, which requires forward/reverse switching of the vehicle. For example, referring to the third candidate route 413 of FIG. 4B, it may be assumed that the host vehicle 200 has started a route search at node 0 and then moved to node 3. In this case, after proceeding to node 3, the host vehicle 200 may return to node 0 because there is no additional edge to traverse. In other words, a first edge visited by the host vehicle 200 is an edge between the nodes 0 and 3 and may be the same as a second visited edge that is also an edge between nodes 0 and 3.

According to some example embodiments, when forward/reverse switching is required, $c_i$ has a value of 1; otherwise it has a value of 0. $w_{gear}$ denotes a parameter related to forward/reverse switching of the vehicle. When a value of $w_{gear}$ is set to be large, it may be understood that the cost associated with forward/reverse switching of the host vehicle 200 is increased significantly. For example, when it takes a long time for the host vehicle 200 to switch from a forward gear to a reverse gear, the value of $w_{gear}$ may be set to be large. In some example embodiments, $w_{gear}$ may relate to the cost associated with turning a car around, such that the car travels down the edge in forward, performs a U-turn or appropriate maneuver and returns down the same edge in forward.

Figure 5:
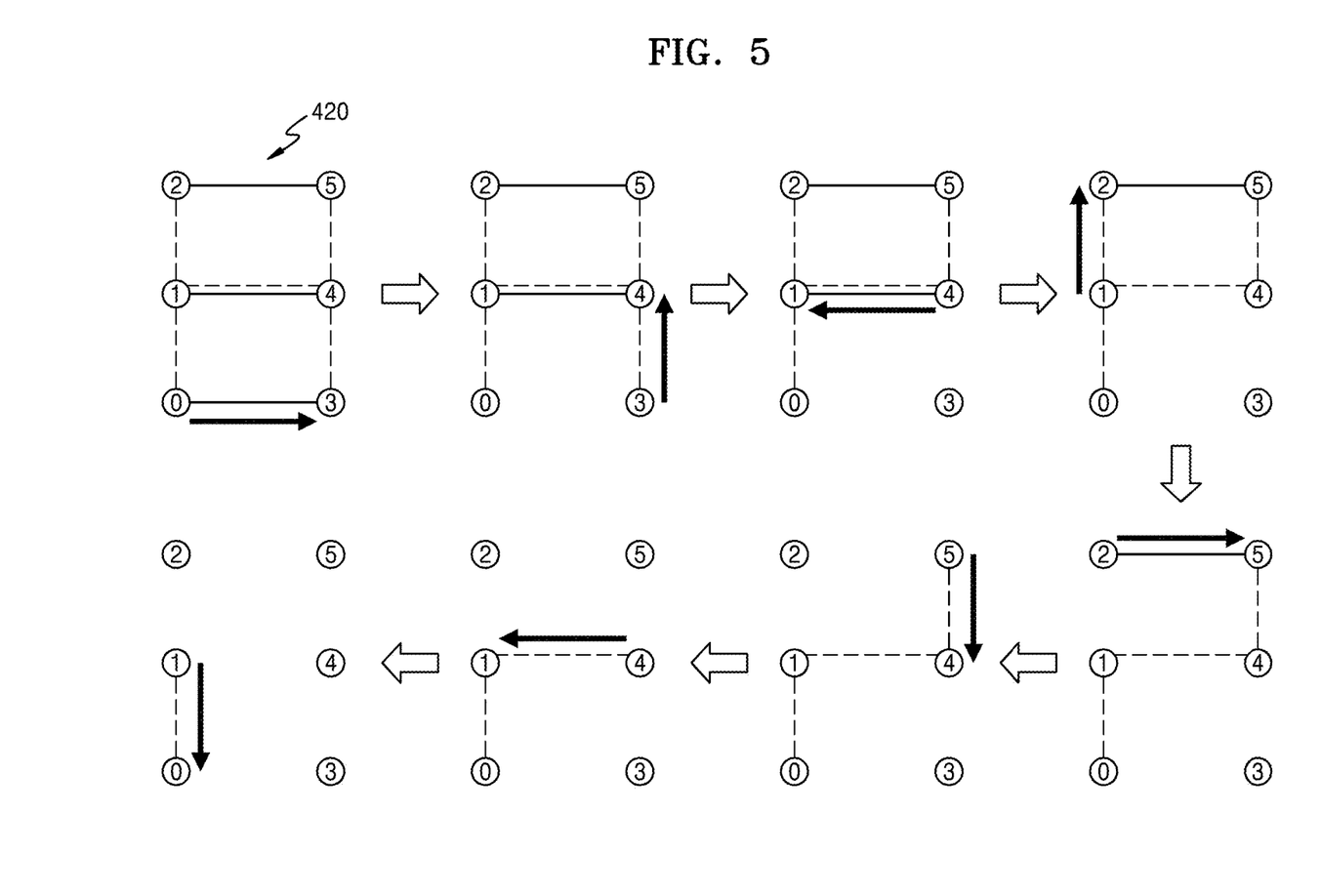
FIG. 5 illustrates an example of performing a route search algorithm based on a cost function, according to some example embodiments of the inventive concepts.

FIG. 5 illustrates an example of performing a route search algorithm based on a cost function, according to some example embodiments of the inventive concepts.

Referring to FIG. 5, a description will be provided based on the first candidate route (420 of FIG. 4C) to which the virtual optional edge is added by the Euler route generator 134, and it may be assumed hereinafter that a current location of the host vehicle 200 is at node 0. An edge along which the host vehicle 200 travels may be indicated by (a, b), where a is a source node and b is a destination node. It is also assumed that optional edges (0, 1) and (3, 4) each have a length of 2, essential edges (0, 3), (1, 4), and (2, 5) each have a length of 3, optional edges (1, 2) and (4, 5) each has a length of 1, and $w_{gear}$ is set to 5.

At node 0, the host vehicle 100 may travel along one of the optional edge (0, 1) and the required edge (0, 3). The cost function calculator 136 may calculate a travel cost incurred when travelling along each edge, based on a cost function. When the host vehicle 200 travels along the optional edge (0,1), a travel cost may be calculated as 8−0/8×1×2+5×0=2, and when the host vehicle 200 travels along the required edge (0, 3), a travel cost may be calculated as 8−0/8×(−1)× 3+5×0=−3. Thus, the host vehicle 200 may start a route from node 0, visit the required edge (0, 3), and move to node 3. In some example embodiments, the route determiner 130 may recognize that a required edge must be always visited when an edge that is to be traversed at a specific node includes a required or optional edge. When the required edge is visited, a travel cost may be reduced because $p_i$ always has a negative value.

Because the host vehicle 200 that has moved to node 3 may visit only the optional edge (3, 4), the host vehicle 200 may visit the edge (3, 4) and move to node 4.

The host vehicle 200 that has moved to the node 4 may visit one of an optional edge (4, 1), a required edge (4, 1), and an optional edge of (4, 5). As described above, because a travel cost may be reduced when visiting a required edge, the host vehicle 200 may visit the required edge (4, 1) and move to node 1.

At node 1, the host vehicle 200 may visit one of the optional edges (1, 0), (1, 2), and (1, 4). When the host vehicle 200 travels along the optional edge (1,0), a travel cost is calculated as 8−3/8×1×2+5×0=1.25. When the host vehicle 200 visits the optional edge (1, 2), a travel cost is calculated as 8−3/8×1×1+5×0=0.625. When the host vehicle 200 visits the optional edge (1, 4), a travel cost is calculated as 8−3/8×1×3+5×1=6.875. In other words, because the host vehicle 200 visits the optional edge (1, 4) in a reverse direction to visiting the required edge (4, 1), a travel cost may increase significantly according to forward and reverse motions of the host vehicle 200. In other words, at the node 1, the host vehicle 200 may determine to visit the optional edge (1, 2) having a lowest travel cost and may move to node 2. Thereafter, the host vehicle 200 may sequentially travel toward the node 0 through nodes 5, 4, and 1. Only one edge may be visited at each node, and a route that traverses the optional edge (1, 4) is not selected because the travel cost increases significantly due to a reverse motion of the host vehicle 200. In other words, as seen in FIG. 5, a travelling route of the host vehicle 200 for the first candidate route 411 of FIG. 4B is [0, 3, 4, 1, 2, 5, 4, 1, 0] The cost function calculator 136 may calculate a travel cost incurred when visiting the edges in the travelling route as [8−0/8×(−1)×3+ 5×0]+[8−1/8×(+1)×2+5×0]+[8−2/8×(−1)×3+5×0]+[8−3/8× (+1)×1+5×0]+[8−4/8×(−1)×3+5×0]+[8−5/8×(+1)×1+5×0]+ [8−6/8×(+1)×3+5×0]+[8−7/8×(+1)×2+5×0]=−3.0.

Figure 6:
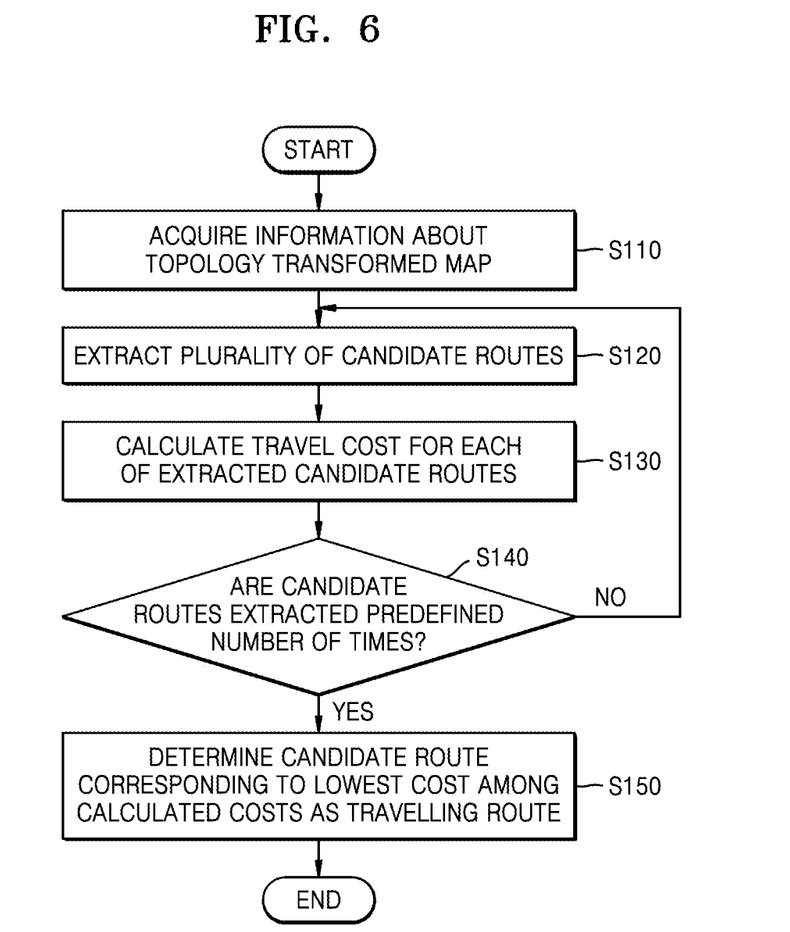
FIG. 6 illustrates an operation method of an optimal route searching device, according to some example embodiments of the inventive concepts.

FIG. 6 illustrates an operation method of an optimal route searching device, according to example embodiments of the inventive concept. It will be understood that the operations shown in FIG. 6 may be implemented in different orders than illustrated, and one or more operations may be omitted from the flowchart of operations shown in FIG. 6.

Referring to FIG. 6, the optimal route searching device (100 of FIG. 1) may acquire topology transformed map information DT_TTM (operation S110). The optimal route searching device 100 may receive map information DT_MAP from an external device and acquire topology transformed map information DT_TTM based on the topology transformation circuit 120. The topology transformed map information DT_TTM may include essential edges corresponding to parking spaces, optional edges corresponding to the remaining road regions other than the essential edges, and nodes that are cross points between a plurality of edges.

In some example embodiments, the topology transformation circuit 120 may analyze the map information DT_MAP and convert a required edge corresponding to a parking space into an optional edge when the required edge corresponds to a road without an empty parking space. Because the host vehicle 200 is not able to park in a required edge without an available parking space, visiting the required edge may lead to the same result as passing through an optional edge.

The optimal route searching device 100 may extract a plurality of candidate routes (operation S120). Each of the candidate routes may refer to routes, each including all essential edges in topology transformed map information DT_TTM but selectively including optional edges.

In some example embodiments, the optimal route searching device 100 may adjust the number of candidate routes to be generated. The optimal route searching device 100 may assume that the number of cases in which all of the essential edges and at least some of the optional edges are included in a route is N. As the number of essential edges and optional edges increases, the total number of candidate routes to be generated may increase greatly. Due to this, when the optimal route searching device 100 generates all N candidate routes and calculates a travel cost for each of the candidate routes, an optimal route may be found, but an excessive amount of time may be required to find the optimal route and a load may be increased. Thus, the optimal route searching device 100 may generate M candidate routes, and M may be less than N. For example, M may be a number that is 60% to 70% of N.

The optimal route searching device 100 may calculate a travel cost for each of the extracted candidate routes (operation S130). Descriptions are already provided above with respect to calculation of a travel cost for a candidate route and will not be repeated below.

The optimal route searching device 100 may determine whether the candidate routes are extracted a predefined, or alternatively, desired or determined, number of times (operation S140). The predefined, or alternatively, desired or determined, number of times may refer to the number of generation iterations according to a genetic algorithm. For example, the optimal route searching device 100 may extract M candidate routes from the topology transformed map information DT_TTM and calculate a travel cost for each of the M candidate routes. The M candidate routes extracted from the topology transformed map information DT_TTM may be referred to as first-generation candidate routes. The optimal route searching device 100 may identify two candidate routes corresponding to low travel costs from among the first-generation candidate routes. The optimal route searching device 100 may combine the two candidate routes with each other to generate new M candidate routes, and the new M candidate routes may be referred to as second-generation candidate routes. The optimal route searching device 100 may repeatedly perform the genetic algorithm until candidate routes for a number of generations corresponding to the predefined, or alternatively, desired or determined, number of times are all extracted. The predefined, or alternatively, desired or determined, number of times may be adaptively determined based on the complexity of the topology transformed map information DT_TTM and the number of optional edges.

The optimal route searching device 100 may determine a candidate route corresponding to a lowest cost one of the calculated travel costs as a travelling route (operation S150). The optimal route searching device 100 may transmit information about the candidate route corresponding to the lowest travel cost to the vehicle controller 140. The vehicle controller 140 may control the host vehicle 200 to perform driving through the entire parking area based on the topology transformed map information DT_TTM and the transmitted candidate route. As a result, the host vehicle 200 may be controlled to park in an available parking spot in the lowest cost route.

While the inventive concepts have been particularly shown and described with reference to some example embodiments thereof, it will be understood that various changes in form and details may be made therein without departing from the spirit and scope of the following claims.

What is claimed is:

1. An operation method of an optimal route searching device, the operation method comprising:
    receiving map information covering a parking area, by electronically communicating with an external device;
    generating topology transformed map information based on the received map information and extracting information related to actual parking space in a parking area, roads for moving between parking spaces, and intersecting roads, the extracted information used to generate visual information representing essential edges corresponding to roads including parking spaces, optional edges corresponding to roads other than the essential edges, and nodes corresponding to cross points between roads;
    extracting a plurality of candidate routes based on the topology transformed map information;
    determining whether the plurality of candidate routes are extracted a determined number of times, wherein the determined number of times corresponds to a number of generation iterations based on a genetic algorithm and varies depending on a number of optional edges;
    halting the extracting of the plurality of candidate routes based on the generation iterations equaling the determined number;
    calculating a travel cost for each of the plurality of candidate routes based on a cost function; and
    determining a candidate route corresponding to a lowest cost one of the calculated travel costs as a travelling route.

2. The operation method of claim 1, wherein each of the plurality of candidate routes includes all the essential edges and at least one of the optional edges.

3. The operation method of claim 2, wherein the calculating of the travel cost for each of the plurality of candidate routes includes
    loading the cost function;
    calculating travel costs for the essential edges and the optional edges that are to be visited at a first node corresponding to a current location;
    moving to a second node along an edge corresponding to a lowest travel cost from among the essential edges and the optional edges connected to the first node; and summing travel costs incurred in moving along the essential edges and the optional edges included in each of the plurality of candidate routes.

4. The operation method of claim 3, wherein the cost function is designed to decrease the travel cost based on visiting of the essential edges, increase the travel cost based on visiting of the optional edges, and increase the travel cost based on successive visiting of the same essential or optional edge.

5. The operation method of claim 1, further comprising transmitting information about the determined traveling route to a vehicle controller.

6. An optimal route searching device comprising:
processing circuitry configured to
receive map information covering a parking area, by electronically communicating with an external device;
generate a topology transformation based on the received map information and extracting information related to actual parking space in a parking area, roads for moving between parking spaces, and intersecting roads, the extracted information used to generate visual information representing essential edges corresponding to roads including parking spaces, optional edges corresponding to roads other than the essential edges, and nodes corresponding to cross points between roads; and
extract a plurality of candidate routes based on topology transformed map information,
determine whether the plurality of candidate routes are extracted a determined number of times, wherein the determined number of times corresponds to a number of generation iterations based on a genetic algorithm and varies depending on a number of optional edges;
halt the extracting of the plurality of candidate routes based on the generation iterations equaling the determined number;
calculate a travel cost for each of the plurality of candidate routes based on a cost function, and
determine a candidate route corresponding to a lowest cost one of the calculated travel costs as a travelling route.

7. The optimal route searching device of claim 6, wherein each of the plurality of candidate routes includes all the essential edges and at least one of the optional edges.

8. The optimal route searching device of claim 7, wherein the processing circuitry is further configured to
load the cost function;
calculate travel costs for the essential edges and the optional edges that are to be visited at a first node corresponding to a current location;
move to a second node along the essential edges and the optional edges corresponding to a lowest travel cost from among the edges connected to the first node; and
sum travel costs incurred in moving along the essential edges and the optional edges included in each of the plurality of candidate routes.

9. The optimal route searching device of claim 8, wherein the cost function is designed to decrease the travel cost based on visiting of the essential edges, increase the travel cost based on visiting of the optional edges, and increase the travel cost based on successive visiting of the same essential or optional edge.

10. The optimal route searching device of claim 6, wherein the processing circuitry is further configured to transmit information about the determined traveling route to a vehicle controller.

11. A host vehicle comprising:
at least one sensor;
a vehicle controller; and
processing circuitry configured to
receive map information covering a parking area, by electronically communicating with an external device;
generate a topology transformation based on the received map information and extracting information related to actual parking space in a parking area, roads for moving between parking spaces, and intersecting roads, the extracted information used to generate visual information representing essential edges corresponding to roads including parking spaces, optional edges corresponding to roads other than the essential edges, and nodes corresponding to cross points between roads; and
extract a plurality of candidate routes based on topology transformed map information,
determine whether the plurality of candidate routes are extracted a determined number of times, wherein the determined number of times corresponds to a number of generation iterations based on a genetic algorithm and varies depending on a number of optional edges;
halt the extracting of the plurality of candidate routes based on the generation iterations equaling the determined number;
calculate a travel cost for each of the plurality of candidate routes based on a cost function, and
determine a candidate route corresponding to a lowest cost one of the calculated travel costs as a travelling route.

12. The host vehicle of claim 11, wherein each of the plurality of candidate routes includes all the essential edges and at least some of the optional edges.

13. The host vehicle of claim 12, wherein the processing circuitry is further configured to
load the cost function;
calculate travel costs for the essential edges and the optional edges that are to be visited at a first node corresponding to a current location;
move to a second node along the essential edges and the optional edges corresponding to a lowest travel cost from among the edges connected to the first node; and
sum travel costs incurred in moving along the essential edges and the optional edges included in each of the plurality of candidate routes.

14. The host vehicle of claim 13, wherein the cost function is designed to decrease the travel cost based on visiting of the essential edges, increase the travel cost based on visiting of the optional edges, and increase the travel cost based on successive visiting of the same essential or optional edge.

15. The host vehicle of claim 11, wherein
the processing circuitry is further configured to transmit information about the determined traveling route to the vehicle controller,
the vehicle controller is further configured to drive the host vehicle based on the transmitted information about the determined traveling route, and the at least one sensor is configured to determine whether there is a parking space based on an image of a front of the host vehicle while the host vehicle travels.

\* \* \* \* \*

UNITED STATES PATENT AND TRADEMARK OFFICE
CERTIFICATE OF CORRECTION

| | | |
|---|---|---|
| PATENT NO. | : 11,768,080 B2 | Page 1 of 1 |
| APPLICATION NO. | : 17/032644 | |
| DATED | : September 26, 2023 | |
| INVENTOR(S) | : Minsoo Kim et al. | |

It is certified that error appears in the above-identified patent and that said Letters Patent is hereby corrected as shown below:

On the Title Page

In the Assignee (item (73)), the Assignee listed as "SAMSUNG ELECTRONICS CO., LTD." is missing the other assignee and should be listed as:
-- SAMSUNG ELECTRONICS CO., LTD. Gyeonggi-DO (KR)
SEOUL NATIONAL UNIVERSITY INDUSTRY FOUNDATION Seoul (KR) --

Signed and Sealed this
Eighth Day of October, 2024

Katherine Kelly Vidal
*Director of the United States Patent and Trademark Office*